United States Patent
Arata et al.

(10) Patent No.: US 11,752,490 B2
(45) Date of Patent: Sep. 12, 2023

(54) SUPPORTED METAL CATALYST AND METHOD FOR PRODUCING SAME

(71) Applicants: Nihon Kagaku Sangyo Co., Ltd., Tokyo (JP); University of Yamanashi, Kofu (JP)

(72) Inventors: Chisato Arata, Tokyo (JP); Hajime Kashima, Tokyo (JP); Katsuyoshi Kakinuma, Kofu (JP); Makoto Uchida, Kofu (JP); Akihiro Iiyama, Kofu (JP)

(73) Assignees: Nihon Kagaku Sangyo, Co, Ltd., Tokyo (JP); University of Yamanishi, Yamanashi (JP)

( * ) Notice: Subject to any disclaimer, the term of this patent is extended or adjusted under 35 U.S.C. 154(b) by 228 days.

(21) Appl. No.: 17/286,785

(22) PCT Filed: Oct. 16, 2019

(86) PCT No.: PCT/JP2019/040661
§ 371 (c)(1),
(2) Date: Apr. 19, 2021

(87) PCT Pub. No.: WO2020/080400
PCT Pub. Date: Apr. 23, 2020

(65) Prior Publication Data
US 2021/0339224 A1    Nov. 4, 2021

(30) Foreign Application Priority Data

Oct. 19, 2018 (JP) ................................ 2018-197385

(51) Int. Cl.
*B01J 21/06* (2006.01)
*B01J 23/14* (2006.01)
(Continued)

(52) U.S. Cl.
CPC ............ *B01J 21/063* (2013.01); *B01J 23/14* (2013.01); *B01J 35/006* (2013.01);
(Continued)

(58) Field of Classification Search
CPC ........ B01J 21/063; B01J 23/14; B01J 35/006; B01J 35/1014; B01J 35/1038;
(Continued)

(56) References Cited

U.S. PATENT DOCUMENTS 10,490,827 B2 * 11/2019 Kakinuma ................ C22C 5/04
2003/0186805 A1 * 10/2003 Vanderspurt ......... B01J 23/6567
423/263

(Continued)

FOREIGN PATENT DOCUMENTS

| CN | 107623133 | 1/2018 |
| JP | 2002184414 | 6/2002 |

(Continued)

OTHER PUBLICATIONS

Extended European Search Report dated Nov. 19, 2021, issued in corresponding International Application No. PCT/JP2019/040661, filed Oct. 16, 2019, 10 pages.

(Continued)

*Primary Examiner* — Patricia L. Hailey
(74) *Attorney, Agent, or Firm* — Christensen O'Connor Johnson Kindness PLLC (57) ABSTRACT

A support powder can improve cell performance under high humidity environment. A support and metal catalyst, including: a support powder; and metal fine particles supported on the support powder; wherein: the support powder is an aggregate of support fine particles; the support fine particles are fine particles of oxide compound and has a chained portion structured by a plurality of crystallites being fusion bonded to form a chain; the crystallites have a size of 10 to (Continued)

30 nm; the support powder has a void; the void includes a secondary pore having a pore diameter of more than 25 nm and 80 nm or less determined by BJH method; and a volume of the secondary pore per unit volume of the support fine particles structuring the support powder is 0.313 $cm^3/cm^3$ or more, is provided.

7 Claims, 9 Drawing Sheets

(51) Int. Cl.
    *B01J 35/00*     (2006.01)
    *B01J 35/10*     (2006.01)
    *B01J 37/08*     (2006.01)
    *H01M 4/90*     (2006.01)

(52) U.S. Cl.
    CPC ....... *B01J 35/1014* (2013.01); *B01J 35/1038* (2013.01); *B01J 35/1061* (2013.01); *B01J 35/1066* (2013.01); *B01J 37/08* (2013.01); *H01M 4/9075* (2013.01)

(58) Field of Classification Search
    CPC .... B01J 35/1061; B01J 35/1066; B01J 37/08; H01M 4/9075
    USPC .............. 502/326, 350, 352; 429/218.1
    See application file for complete search history.

(56) References Cited

U.S. PATENT DOCUMENTS

| | | |
|---|---|---|
| 2012/0295184 A1 | 11/2012 | Watanabe et al. |
| 2013/0065751 A1* | 3/2013 | Hong ................ B01J 37/18 502/328 |
| 2017/0250409 A1 | 8/2017 | Kakinuma et al. |

FOREIGN PATENT DOCUMENTS

| | | |
|---|---|---|
| JP | 2009302044 A | 12/2009 |
| JP | 2013127869 | 6/2013 |
| JP | 2017157353 A | 9/2017 |
| JP | 2018010806 | 1/2018 |
| JP | 2018012626 | 1/2018 |
| WO | 2005040038 A1 | 5/2005 |
| WO | 2011065471 A1 | 6/2011 |
| WO | WO2015050046 | 4/2015 |
| WO | WO2015146454 | 10/2015 |

OTHER PUBLICATIONS

Senoo, Y., et al., "Improvements in 1-6 electrical and electrochemical properties of Nb-doped SnO 2-o supports for fuel cell cathodes due to aggregation and Pt loading", RSC Adv., 2014, vol. 4, No. 61, 32180-32188.

International Search Report dated Dec. 24, 2019, issued in corresponding International Application No. PCT/JP2019/040661, filed Oct. 16, 2019.

Chino, Y., et al., "Effect of Added Graphitized CB on Both Performance and Durability of Pt/Nb—$SnO_2$ Cathodes for PEFCs", Journal of The Electrochemical Society, 162(7), F736-F743, 2015.

Office Action for CN application No. 201980060899.7, dated Feb. 3, 2023.

Catanoiu et al., "Novel ethoxylated inositol derivatives—Hybrid carbohydrate/oligoethylene oxide surfactants," Journal of Colloid and Interface Science, 371 (2012), pp. 82-88.

* cited by examiner

SUPPORTED METAL CATALYST AND METHOD FOR PRODUCING SAME

FIELD OF THE INVENTION

The present invention relates to a metal catalyst supported on the support fine powder and to a manufacturing method thereof. The metal catalyst and fine support powder of the present invention is suitably used as a cathode electrode catalyst of a fuel cell.

BACKGROUND OF THE INVENTION

Non-Patent Literature 1 discloses of manufacturing support powder by subjecting $Nb$—$SnO_2$ nanoparticles obtained by flame combustion method under heat treatment at 800° C., and then using the support powder for manufacturing a cathode electrode catalyst.

PRIOR ART DOCUMENTS

Patent Literature

[Non-Patent Literature 1] J. Electrochem. Soc. 2015 volume 162, issue 7, F736-F743

SUMMARY OF INVENTION

Technical Problem

Non-Patent Literature 1 discloses of improving cell performance under high humidity environment by adding graphitized carbon black to a Pt catalyst supported on $Nb$—$SnO_2$. However, addition of graphitized carbon black may impair long term stability of the catalyst. Therefore, improvement of cell performance under high humidity environment without adding graphitized carbon black has been desired.

The present invention has been made by taking these circumstances into consideration. The present invention provides a support powder which can improve cell performance under high humidity environment.

Means to Solve the Problem

According to the present invention, a support and metal catalyst, comprising: a support powder; and metal fine particles supported on the support powder; wherein: the support powder is an aggregate of support fine particles; the support fine particles are fine particles of oxide compound and has a chained portion structured by a plurality of crystallites being fusion bonded to form a chain; the crystallites have a size of 10 to 30 nm; the support powder has a void; the void includes a secondary pore having a pore diameter of more than 25 nm and 80 nm or less determined by BJH method; and a volume of the secondary pore per unit volume of the support fine particles structuring the support powder is 0.313 $cm^3/cm^3$ or more, is provided.

The present inventors have conducted intensive research, and have found that degradation of cell performance under high humidity environment is caused by flooding phenomenon in which water generated by catalytic reaction clogs the pore of the catalyst. Based on this knowledge, the inventors have found that when the size of the crystallite structuring support fine particles is 10 nm or more, and the volume of the secondary pore is 0.313 $cm^3/cm^3$ or more, the water generated by catalytic reaction would be promptly discharged out of the catalyst, thereby suppressing the flooding phenomenon. Accordingly, the cell performance under high humidity environment can be improved without adding graphitized carbon black, thereby leading to completion of the invention.

DESCRIPTION OF THE PREFERRED EMBODIMENTS

Hereinafter, embodiments of the present invention will be explained with reference to the drawings. Various distinctive features shown in the following embodiments can be combined with each other. In addition, an invention can be established independently for each of the distinctive features.

1. Support and Metal Catalyst 100

As shown in FIGS. 1 to 4, the support and metal catalyst 100 comprises a support powder which is an aggregate of support fine particles 150 having a chained portion structured by fusion bonding a plurality of crystallites 120 into a chain, and metal fine particles 130 being supported on the support powder. Hereinafter, each of the constituents will be explained.

1-1. Fine Particles 150 and Support Powder

The support fine particles 150 are fine particles of oxides containing one or more elements selected among rare earth, alkaline earth, transition metal, niobium, bismuth, tin, antimony, zirconium, molybdenum, indium, tantalum, and tungsten. Rare-earth, alkaline earth, niobium, bismuth, antimony, and tantalum are preferable since they can be dopants that improve conductivity, transition metals are preferable since they are elements that constitute the matrix that gives conductivity, and other elements mentioned above are preferable since they are elements other than transition metals that constitute the matrix that gives conductivity. The fine particles preferably contain at least one of titanium, iron, niobium, tantalum, zirconium, and tin since these fine particles do not dissolve even under strong acidic conditions.

Figure 1:
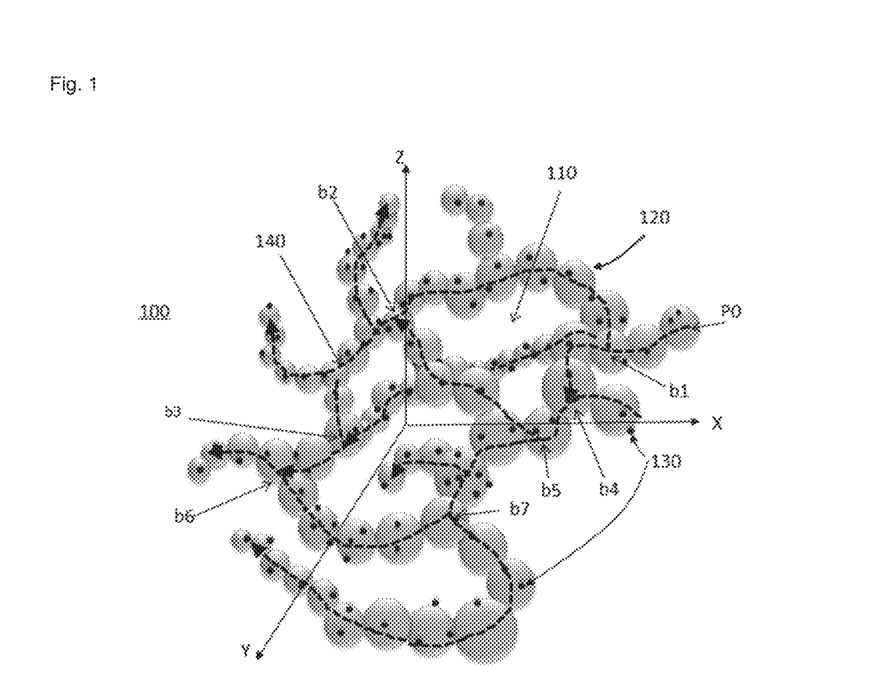
FIG. 1 is a model diagram of a catalyst structure of support and metal catalyst 100.
Figure 2:
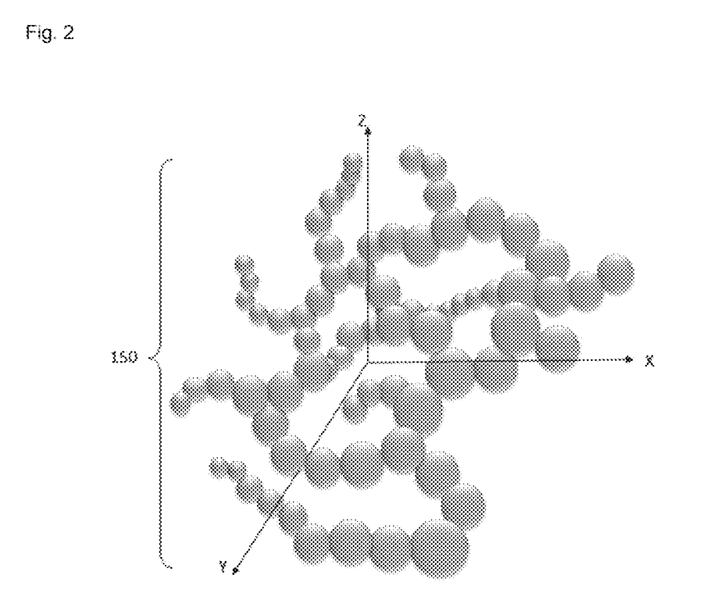
FIG. 2 shows a view in which support fine particles 150 are taken from FIG. 1.
Figure 3:
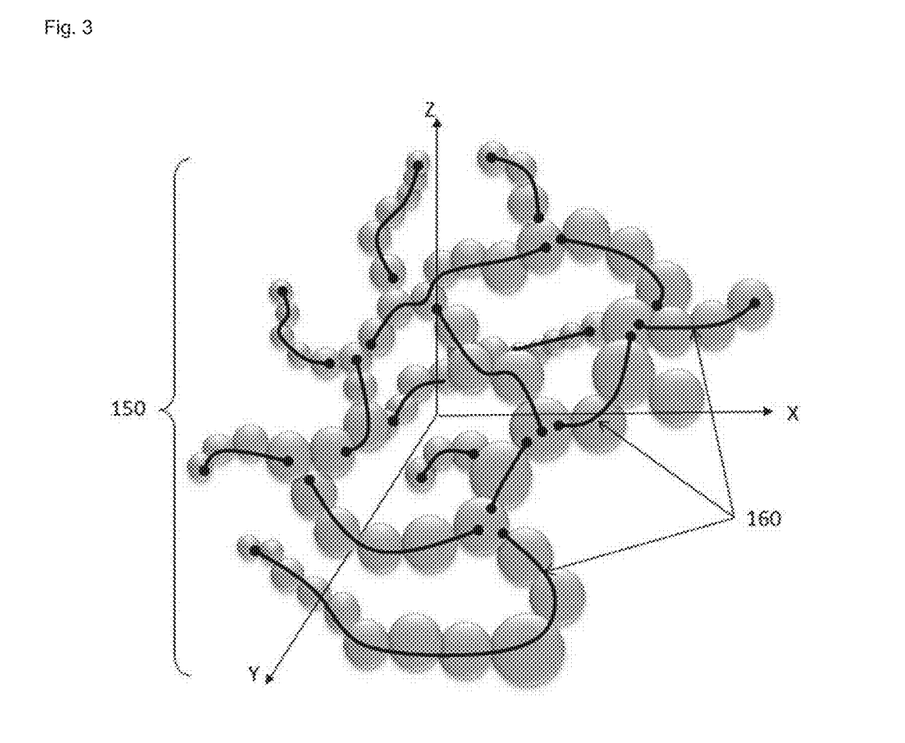
FIG. 3 shows a condition of branch 160 of the support fine particles 150 of FIG. 1.

As shown in FIGS. 1 to 3, in the support fine particles 150, a three-dimensional void 110 surrounded by the branch 160 and pores existing between a plurality of branches is formed. Here, a plurality of crystallites 120 structuring the support fine particles 150 is fusion bonded to form a chained portion, thereby forming the branch 160. Gas diffusion route to diffuse and transfer oxygen as the oxidant and/or hydrogen as the fuel to the support metal catalyst 100 is formed by the three-dimensional arrangement of the support fine particles 150 described above.

Figure 4:
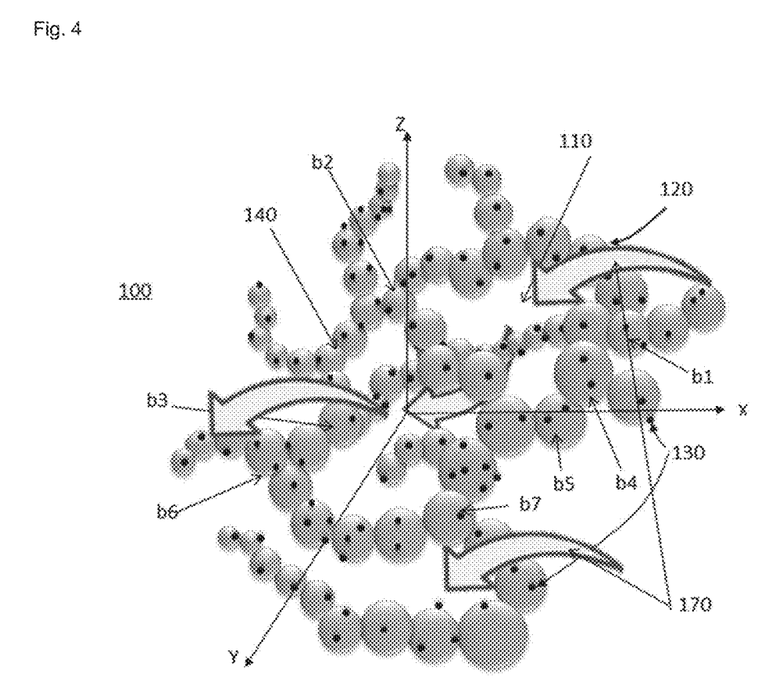
FIG. 4 shows a gas diffusion route of FIG. 1.

As shown in FIGS. 1 to 3 as an example of structure model of the metal catalyst, the support fine particles 150 comprise four pores of a first pore surrounded by points b1, b2, b5, b4, and b1, where the branches link with each other (may be referred to as branching points, or merely as branch); a second pore surrounded by branching points b1, b2, b3, and b1; a third pore surrounded by branching points b2, b3, b6, b7, b5, and b2; and a fourth pore surrounded by branching points b1, b3, b6, b7, b5, b4, and b1. Here, when a plane surrounded by the branching points of each of the pores (first to fourth pores) is taken as the pore plane, the void 110 is a three-dimensional space surrounded by the four pore planes. The support fine particles 150 comprise a plurality of pores surrounded by a plurality of branching points in which a plurality of branches link with each other. Further, the three-dimensional spaces (voids) which are surrounded by the plurality of pores are provided sequentially, thereby structuring the support fine particles. Accordingly, the void serves as the gas diffusion route (gas diffusion path) of oxygen, hydrogen and the like. FIG. 4 shows the gas diffusion route in FIG. 1. In FIG. 4, one example of the gas diffusion route (gas diffusion path) of void 110 is shown. Flow (gas diffusion route) 170 of oxidant (gas), fuel gas and the like can flow in the desired direction via the void 110 as shown in FIG. 4. That is, the void 110 serves as the gas diffusion route.

Here, as a simple structure of the support fine particles 150, the support fine particles can have only one pore (for example, the first pore surrounded by the branching points b1, b2, b5, b4, and b1). In such case, a void 110 having a thickness of the crystallite grain of the crystallite 120 is provided. As a more simple structure, the support fine particles 150 can have one or more branches. In such case, the branches within the support fine particles 150 prohibits cohesion of the support fine particles, thereby providing void 110 between the support fine particles.

Here, the "pore" mentioned above can also be mentioned as closed curve (closed loop). Otherwise, it can be said that a void 110 surrounded by a closed plane including the afore-mentioned plurality of branching points (for example, branching points b1 to b7) is provided. As the branching points b1 to b7, the center of gravity of the crystallite of the metal oxide structuring the support fine particles 150 in which the branches connect with each other can be taken as the branching point, or an arbitrary point in the crystallite can be taken as the branching point.

The size of the crystallite 120 is preferably 10 to 30 nm, more preferably 10 to 15 nm. The size is, particularly for example, 10, 11, 12, 13, 14, 15, 16, 17, 18, 19, 20, 25, or 30 nm, and can be in the range between the two values exemplified herein. The size of the crystallite 120 (crystallite diameter) can be obtained in accordance with a Sheller formula using half-width in the XRD pattern peak. When the crystallite 120 is too small, the oxide would easily elute, and the durability of the catalyst may degrade. When the crystallite 120 is too large, the volume of the secondary pore would become small, thereby becoming prone to flooding phenomenon.

The aggregate of the support fine particles 150 is in the form of a powder. Such aggregate is referred to as "support powder".

The mean particle size of the support fine particles 150 in the support powder is preferably in the range of 0.1 μm to 4 μm, more preferably in the range of 0.5 μm to 2 μm. The mean particle size of the support fine particles 150 can be measured with a laser diffraction/scattering particle size distribution analyzer.

Hereinafter, a case in which fine particles of tin oxide are used as the support fine particles will be explained. The specific surface area of the support powder is preferably 12 $m^2/g$ or more, and is more preferably 25 $m^2/g$ or more. The specific surface area is, for example, 12 to 100 $m^2/g$, particularly for example, 12, 15, 20, 25, 30, 35, 40, 45, 50, or 100 $m^2/g$, and can be in the range between the two values exemplified herein. These values are for the case of fine particles of tin oxide, and the values per unit weight differ for cases when other oxides are used, since true density differs from tin oxide. Therefore, for generalization, the value will be converted to a value per unit volume of support fine particles constituting the support powder. Since the true density of tin oxide is 6.95 $g/cm^3$, the value can be converted to specific surface area for 1 $cm^3$ by multiplying this true density to the afore-mentioned value. For example, 12 $m^2/g$ would be converted as 83.4≈83 $m^2/cm^3$, and 25 $m^2/g$ would be converted as 173.75≈174 $m^2/cm^3$. This value is, particularly for example, 83, 85, 90, 95, 100, 105, 110, 115, 120, 125, 130, 135, 140, 145, 150, 155, 160, 165, or 170 $m^2/cm^3$, and can be in the range between the two values exemplified herein.

The voids 110 contained in the support powder include primary pores having a pore diameter of 25 nm or less determined by BJH method, and secondary pores having a pore diameter of more than 25 nm and 80 nm or less. The volume of the secondary pore is 0.045 $cm^3/g$ or more. This value is also for the case of tin oxide fine particles. For generalization, the value will be converted to a value per unit volume of support fine particles constituting the support powder. In a similar manner, by multiplying true density of tin oxide, 0.045 $cm^3/g$ would be converted as 0.31275≈0.313 $cm^3/cm^3$, and thus 1 $cm^3$ of the support powder would have a secondary pore volume of 0.313 $cm^3$. Similarly, the value per unit weight as shown below can be easily generalized (to a value per unit volume).

The primary pores and the secondary pores have a large relation with the discharge of water generated by catalytic reaction. The primary pores mainly serve to transfer the water generated at the surface of the catalyst to the secondary pore connected to the primary pore. The secondary pores mainly serve to transfer the water transferred from the primary pores outside the catalyst layer. When the volume of these primary pores and secondary pores are too small, flooding phenomenon tends to occur. In the present embodiment, the volume of the secondary pore is relatively large as 0.045 $cm^3/g$ or more, and thus the flooding phenomenon is suppressed. The volume of the secondary pore is, for example, 0.045 to 0.100 $cm^3/g$, particularly for example, 0.045, 0.050, 0.055, 0.060, 0.065, 0.070, 0.075, 0.080, 0.085, 0.090, 0.095, or 0.100 $cm^3/g$, and can be in the range between the two values exemplified herein. When the value is generalized to other oxides, the volume of the secondary pore is, for example, 0.312 to 0.695 $cm^3/cm^3$, particularly for example, 0.312, 0.350, 0.400, 0.450, 0.500, 0.550, 0.600, 0.650, or 0.695 $cm^3/cm^3$, and can be in the range between the two values exemplified herein.

The value of volume of primary pore/volume of secondary pore is preferably 0.80 or lower. In such case, the volume of the secondary pore becomes sufficiently large, thereby easily suppressing the flooding phenomenon. This value is, for example, 0.10 to 0.80, particularly for example, 0.10, 0.15, 0.20. 0.25, 0.30, 0.35, 0.40, 0.45, 0.50, 0.55, 0.60, 0.65, 0.70, 0.75, or 0.80, and can be in the range between the two values exemplified herein.

The support powder preferably has a void fraction of 50% or higher, more preferably 60% or higher. The void fraction is, for example, 50 to 80%, particularly for example, 50, 55, 60, 65, 70, 75, or 80%, and can be in the range between the two values exemplified herein. The void fraction can be obtained by mercury press-in method or by FIB-SEM.

The support powder preferably has a repose angle of 50 degrees or less, and more preferably a repose angle of 45 degrees or less. In such case, the support powder has a similar flowability as flour, and thus handling is simple. The repose angle is, for example, 20 to 50 degrees, particularly for example, 20, 25, 30, 35, 40, 45, or 50, and can be in the range between the two values exemplified herein. The repose angle can be obtained by drop volume method.

Conductivity of the support powder is preferably 0.001 S/cm or higher, and is more preferably 0.01 S/cm or higher. The conductivity is, for example, 0.01 to 1000 S/cm, particularly for example, 0.01, 0.1, 1, 10, 100, or 1000 S/cm, and can be in the range between the two values exemplified herein. Conductivity can be measured in accordance with the JIS standard (JIS K 7194).

The support fine particles 150 have a branch 160 comprising a chained portion which is structured by fusion bonding a plurality of crystallites 120 into a chain. The branch 160 itself has a nature to allow electrons to flow. As shown in FIGS. 1 to 4, the support fine particles 150 have a plurality of branches 160, and the branches connect with each other at branching points (b1 to b7), by which a network is structured. Electrically conductive nature can be seen among these. Accordingly, the branches 160 of the support fine particles 150 shown by the dotted line from point PO in FIG. 1 itself structures an electron conduction route (electron conduction path) 140.

1-2. Metal Fine Particles 130

The metal fine particles 130 are fine particles of metal (for example, platinum) or alloy which can serve as a catalyst. The mean particle size of the plurality of metal fine particles 130 supported on the support powder is preferably 1 to 20 nm, more preferably 3 to 10 nm. The mean particle size is, particularly for example, 1, 2, 3, 4, 5, 6, 7, 8, 9, 10, 11, 12, 13, 14, 15, 16, 17, 18, 19, or 20 nm, and can be in the range between the two values exemplified herein. When the mean particle size of the metal fine particles 130 is smaller than 1 nm, the metal fine particles would dissolve along with the progress of the electrode reaction. On the other hand, when the mean particle size is larger than 20 nm, the electrochemical active area would become small, and thus the desired electrode performance cannot be achieved. The mean particle size of the metal fine particles 130 can be obtained by measuring the diameter of the circumscribed circle of all the metal fine particles 130 in the TEM image of the support metal catalyst 100, and then calculating the arithmetic mean of the measured diameter.

The metal fine particles 130 are constituted with arbitrary metal or metal alloy having catalytic activity. The metal fine particles 130 are preferably constituted with noble metal solely, or with metal alloy of noble metal and transition metal. The metal fine particles 130 may comprise a core and a skin layer covering the core. The core preferably comprises an alloy of a noble metal and a transition metal. The skin layer preferably comprises a noble metal. As the noble metal, platinum is preferable. As the transition metal, cobalt (Co) or nickel (Ni) are preferable, and cobalt is especially suitable.

The amount of the metal fine particles 130 being supported is preferably 1 to 50 mass %, more preferably 5 to 25 mass %. The amount being supported is, particularly for example, 1, 5, 10, 15, 20, 25, 30, 35, 40, 45, or 50 mass %, and can be in the range between the two values exemplified herein.

2. Fuel Cell 200

Figure 5:
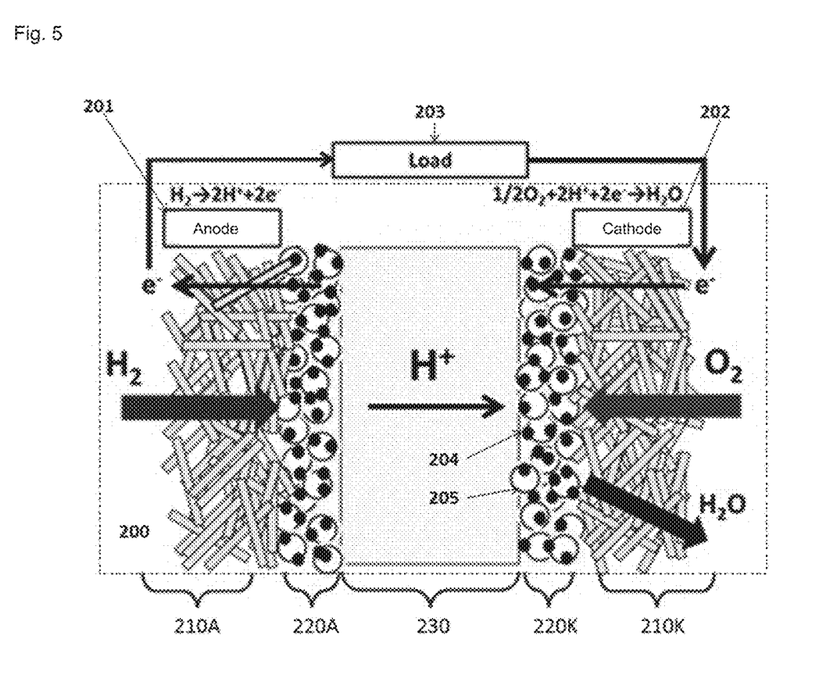
FIG. 5 is a model diagram of a fuel cell.

A model diagram of the fuel cell according to the present invention is shown in FIG. 5. In FIG. 5, the fuel cell 200 is structured by aligning the catalyst layer 220A and the gas diffusion layer 210A on the anode 201 side, and the catalyst layer 220K and the gas diffusion layer 210K on the cathode 202 side, facing each other with the electrolyte membrane 230 in between. That is, the gas diffusion layer 210A on the anode side, the catalyst layer 220A on the anode side, the electrolyte membrane 230, the catalyst layer 220K on the cathode side, and the gas diffusion layer 210K on the cathode side are aligned in this order. The catalyst layer 220K on the cathode side includes the support and metal catalyst 100. The catalyst layer 220A on the anode side can also include the support and metal catalyst 100, or can include a different catalyst. By connecting the load 203 in between the anode 201 and the cathode 202 of the solid polymer electrolyte fuel cell 200, power is output to the load 203.

3. Method for Manufacturing Support Powder

First, referring to FIG. 6 to FIG. 9, the manufacturing apparatus 1 which can be used for the manufacture of the support powder is explained. The manufacturing apparatus 1 comprises a burner 2, a raw material supplying unit 3, a reaction cylinder 4, a collector 5, and a gas reservoir 6. The raw material supplying unit 3 comprises an outer cylinder 13, and a raw material distribution cylinder 23.

Figure 6:
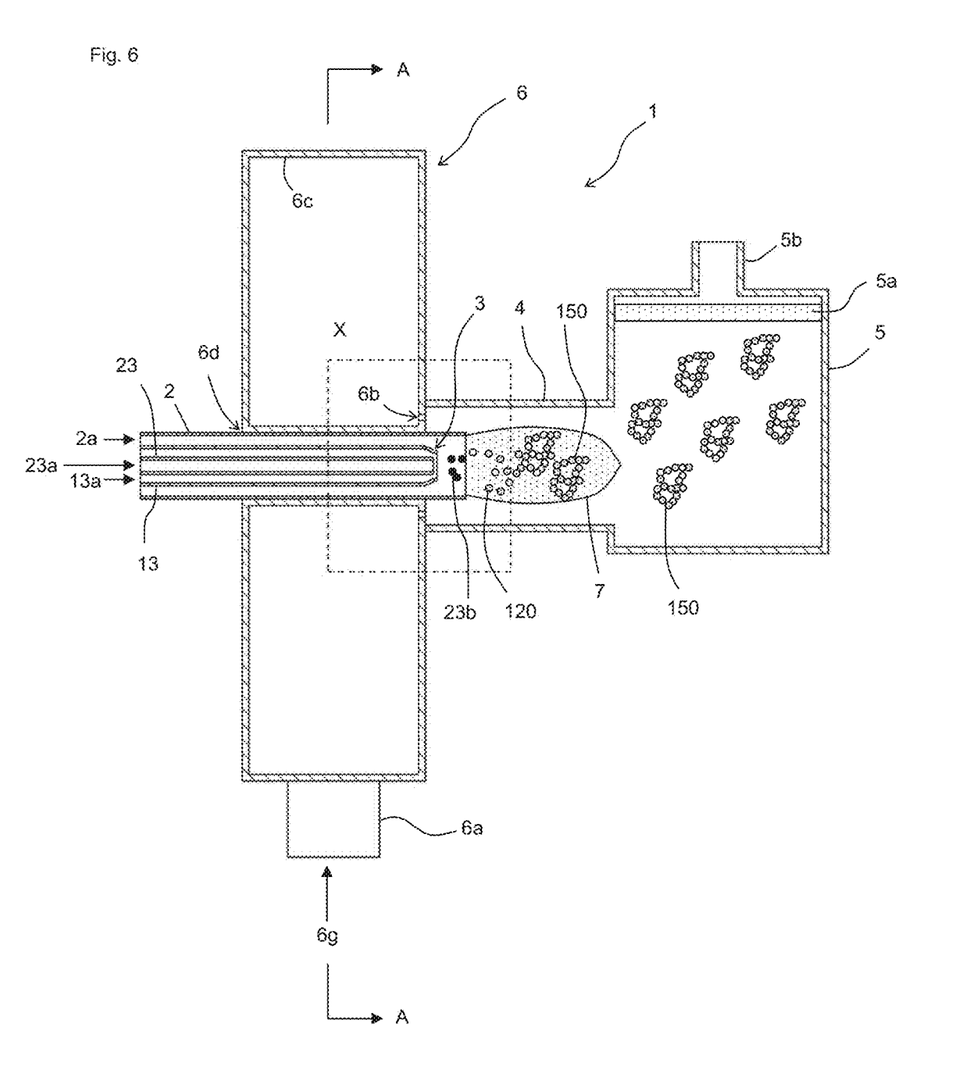
FIG. 6 is a sectional view which is cut through the center of burner 2 of a manufacturing apparatus 1 for manufacturing the support powder.
Figure 7:
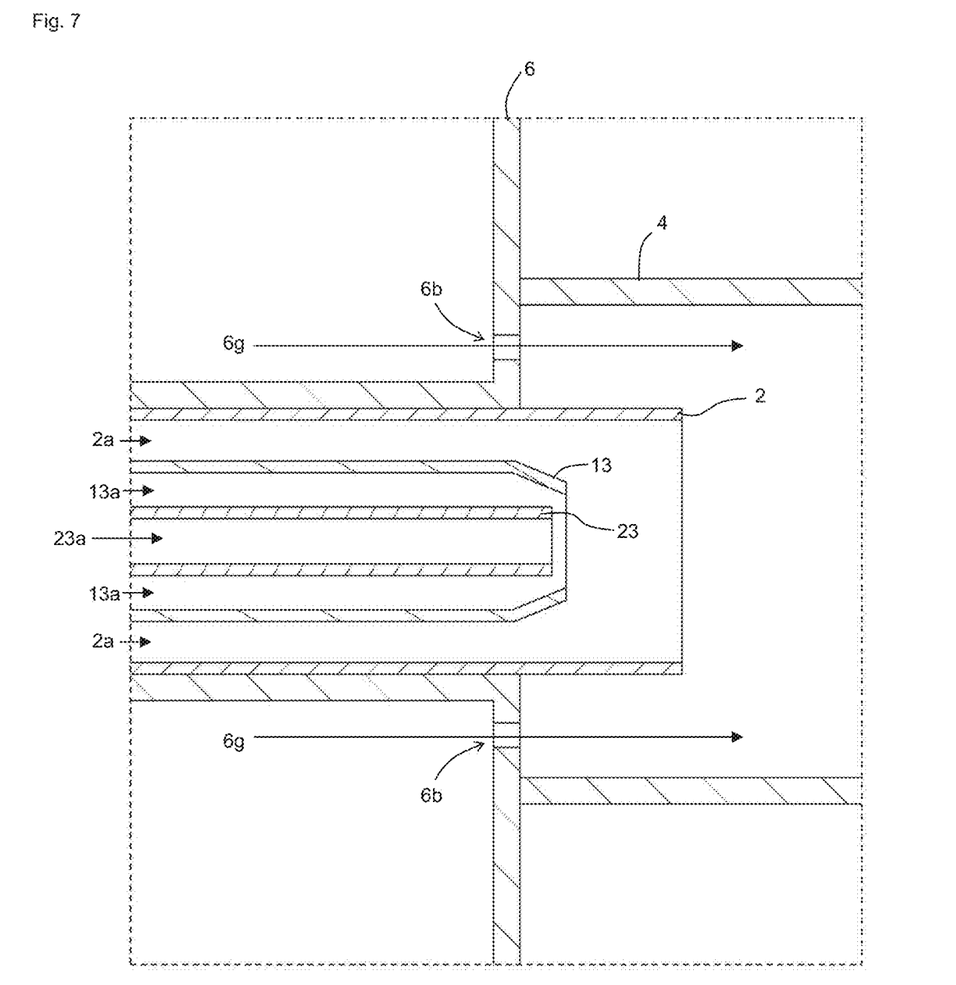
FIG. 7 is an enlarged view of region X in FIG. 6.

The burner 2 is a cylinder, and the raw material supplying unit 3 is arranged in the burner 2. Burner gas 2a is distributed between the burner 2 and the outer cylinder 13. The burner gas 2a is used to form a flame 7 at the tip of the burner 2 by ignition. A high temperature region having a temperature of 1000° C. or higher is formed by the flame 7. The burner gas 2a preferably contains a combustible gas such as propane, methane, acetylene, hydrogen, or nitrous oxide. In one example, a gas mixture of oxygen and propane can be used as the burner gas 2a. The temperature of the high temperature region is 1000 to 2000° C. for example, and is particularly for example, 1000, 1100, 1200, 1300, 1400, 1500, 1600, 1700, 1800, 1900, or 2000° C., and can be in the range between the two values exemplified herein.

A raw material solution 23a for generating the support powder is distributed in the raw material distribution cylinder 23. As the raw material solution 23a, the one containing a metal compound is used. As the metal compound, fatty acid metal (Sn, Ti, Nb, Ta, W and the like) salt can be mentioned for example. The number of carbon atoms in the fatty acid is, for example, 2 to 20, preferably 4 to 15, and further preferably 6 to 12. As the fatty acid metal salt, metal octylate (tin octylate, titanium octylate, niobium octylate, tantalum octylate, tungsten octylate, and the like) are preferable. In the raw material solution 23a, the metal compound is preferably dissolved or dispersed in a non-aqueous solvent.

Mist gas 13a used for converting the raw material solution 23a into a mist is distributed in between the outer cylinder 13 and the raw material distribution cylinder 23. When the mist gas 13a and the raw material solution 23a are jetted together from the tip of the raw material supplying unit 3, the raw material solution 23a is converted into a mist. The mist 23b of the raw material solution 23a is sprayed into the flame 7, and the metal compound in the raw material solution 23a undergoes a thermal decomposition reaction in the flame 7. Accordingly, support powder which is an aggregate of support fine particles 150 having a chained portion structured by fusion bonding the crystallite 120 into a chain is generated. The mist gas 13*a* is oxygen in one example.

The reaction cylinder 4 is provided between the collector 5 and the gas reservoir 6. The flame 7 is formed in the reaction cylinder 4. The collector 5 is provided with a filter 5*a* and a gas discharging portion 5*b*. A negative pressure is applied to the gas discharging portion 5*b*. Accordingly, a flow which flows towards the gas discharging portion 5*b* is generated in the collector 5 and the reaction cylinder 4.

Figure 8:
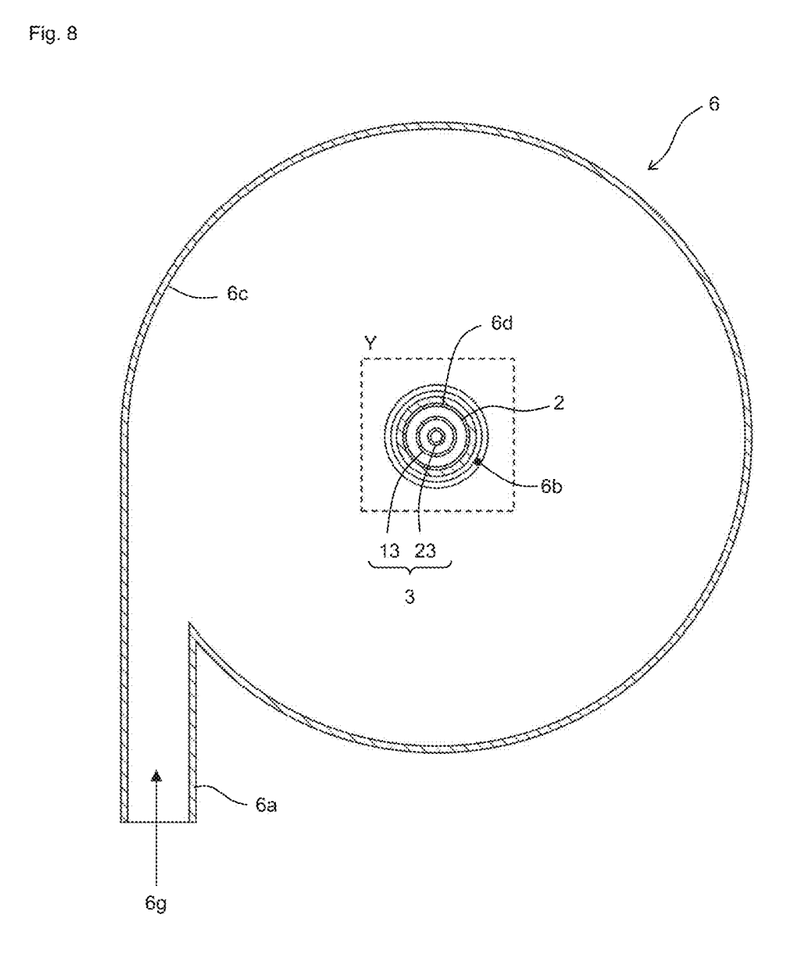
FIG. 8 is a sectional view taken along the line A-A of FIG. 6.
Figure 9:
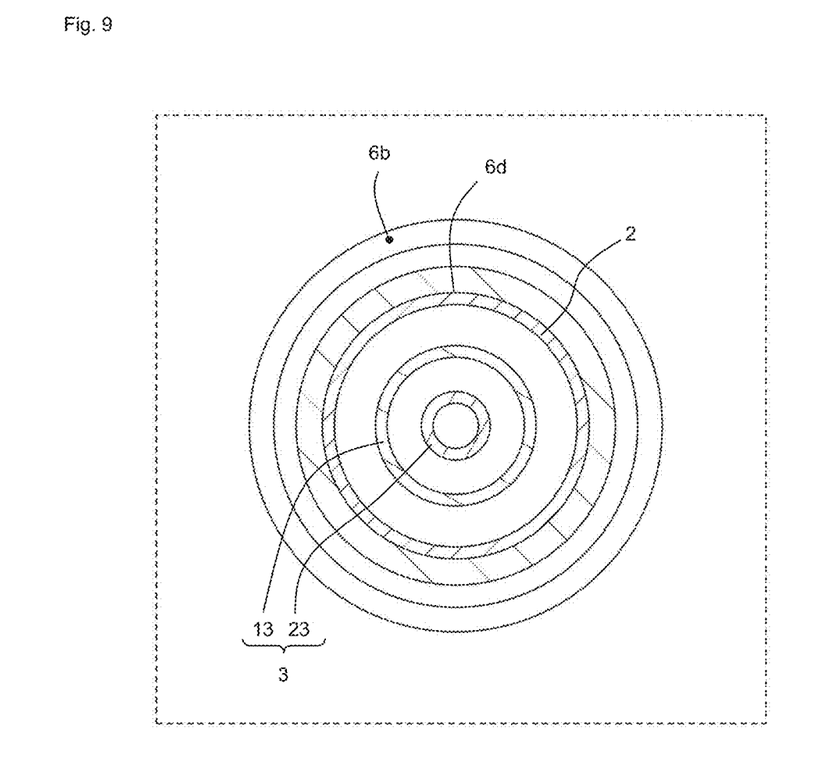
FIG. 9 is an enlarged view of region Y in FIG. 8.

The gas reservoir 6 has a cylinder shape, and comprises a cold gas introducing portion 6*a* and a slit 6*b*. A cold gas 6*g* is introduced from the cold gas introducing portion 6*a* into the gas reservoir 6. The cold gas introducing portion 6*a* is directed in a direction along the tangential line of the inner peripheral wall 6*c* of the gas reservoir 6. Therefore, the cold gas 6*g* introduced through the cold gas introducing portion 6*a* into the gas reservoir 6 revolves along the inner peripheral wall 6*c*. At the center of the gas reservoir 6, a burner insertion hole 6*d* is provided. The burner 2 is inserted through the burner insertion hole 6*d*. The slit 6*b* is provided in the vicinity of the burner insertion hole 6*d* so as to surround the burner insertion hole 6*d*. Accordingly, when the burner 2 is inserted through the burner insertion hole 6*d*, the slit 6*b* is provided so as to surround the burner 2. The cold gas 6*g* in the gas reservoir 6 is driven by the negative pressure applied to the gas discharging portion 5*b*, and is discharged from the slit 6*b* towards the reaction cylinder 4. The cold gas 6*g* can be any gas so long as it can cool the oxide compound generated, and is preferably an inert gas, for example, air. The flow speed of the cold gas 6*g* is preferably two times or more of the flow speed of the burner gas 2*a*. The upper limit of the flow speed of the cold gas 6*g* is not particularly limited, and is 1000 times the flow speed of the burner gas 2*a* for example. The ratio of flow speed of cold gas 6*g*/flow speed of burner gas 2*a* is 2 to 1000 for example, and the ratio is particularly for example, 2, 5, 10, 15, 20, 25, 30, 35, 40, 45, 50, 100, 200, 500, or 1000, and can be in the range between the two values exemplified herein. Here, in the present embodiment, a negative pressure is applied to the gas discharging portion 5*b* to allow the cold gas 6*g* to flow, however, a positive pressure can be applied to the gas introducing portion 6*a* to allow the cold gas 6*g* to flow.

In the present embodiment, the cold gas 6*g* is supplied in the surroundings of the flame 7 through the slit 6*b*, and thus the cold gas 6*g* flow around the flame 7 as a laminar air flow. Therefore, the mist 23*b*, crystallite 120, and the support fine particles 150 would not be scattered by the cold gas 6*g*, allowing them to move along the flame 7 and be heated sufficiently by the flame 7 to progress the reaction. In addition, after the support fine particles 150 come out of the flame 7, the support fine particles 150 would be immediately cooled by the cold gas 6*g*, thereby allowing to maintain the structure having the chained portion. The support fine particles 150 after cooling would be trapped by the filter 5*a* and collected.

In the present embodiment, the support powder which is an aggregate of the support fine particles 150 can be manufactured by using the manufacturing apparatus 1. Here, a high-temperature region of 1000° C. or higher is formed at the tip of the burner 2 by the flame 7, and the metal compound is allowed to undergo a thermal decomposition reaction in this high-temperature region while supplying the cold gas 6*g* through the slit 6*b* to the surroundings of the high-temperature region. The high-temperature region can be formed by plasma instead of the flame 7.

4. Method for Manufacturing Support and Metal Catalyst 100

The method for manufacturing support and metal catalyst 100 comprises a support powder generation step, supporting step, heat treatment step, and a reduction step.

<Support Powder Generation Step>

In the support powder generation step, support powder is generated by the afore-mentioned method.

<Supporting Step>

In the supporting step, the metal fine particles 130 are supported on the support powder. Such supporting can be performed by a reverse micelle method, a colloidal method, an impregnation method and the like.

In the colloidal method, the metal colloidal particles are adsorbed onto the support powder. More particularly, the metal colloidal particles synthesized by the colloidal method is dispersed in an aqueous solution to prepare a dispersion, and then the metal colloidal particles are added and mixed in the dispersion. Accordingly, the colloidal particles are adsorbed onto the surface of the support powder. The support powder having the colloidal particles adsorbed thereon is then filtered and dried, thereby being separated from the dispersion medium.

<Heat Treatment Step>

In the heat treatment step, heat treatment is performed in the temperature range of 500 to 750° C. Accordingly, the crystallite of the support powder undergoes crystal growth and its size becomes larger. Further, when the supporting step is performed by the colloidal method, the colloidal particles become the metal fine particles 130. The temperature of the heat treatment is, particularly for example, 500, 550, 600, 650, 700, or 750° C., and can be in the range between the two values exemplified herein. During this heat treatment step, the crystallite undergoes crystal growth. Here, when the heat treatment temperature is too low, the crystallite 120 of the support fine particles 150 would not grow sufficiently, and easily elute. On the other hand, since the volume of the secondary pore becomes small as the heat treatment temperature rise, when the heat treatment temperature is too high, the volume of the secondary pore becomes too small, thereby becoming prone to flooding phenomenon.

The heat treatment duration time is, for example, 0.1 to 20 hours, preferably 0.5 to 5 hours. The heat treatment duration time is, particularly for example, 0.1, 0.5, 1, 2, 3, 4, 5, 6, 7, 8, 9, 10, 15, or 20 hours, and can be in the range between the two values exemplified herein.

Heat treatment can be carried out under an inert gas atmosphere such as nitrogen, or under an inert gas atmosphere containing 1 to 4% of hydrogen.

<Reduction Step>

In the reduction step, reduction treatment of the metal fine particles 130 is carried out after the heat treatment step. The reduction treatment can be carried out by performing a heat treatment under a reductive atmosphere containing a reductive gas such as hydrogen. The reduction step can be omitted when not necessary.

The temperature of this heat treatment is, for example, 70 to 300° C., preferably 100 to 200° C. This temperature is, particularly for example, 70, 80, 90, 100, 110, 120, 130, 140, 150, 160, 170, 180, 190, 200, 250, or 300° C., and can be in the range between the two values exemplified herein.

The heat treatment duration time is, for example, 0.01 to 20 hours, preferably 0.1 to 5 hours. The heat treatment duration time is, particularly for example, 0.01, 0.05, 0.1, 0.5, 1, 2, 3, 4, 5, 6, 7, 8, 9, 10, 15, or 20 hours, and can be in the range between the two values exemplified herein.

When the reductive gas is hydrogen, the concentration thereof is, for example, 0.1 to 100 volume %, preferably 0.2 to 10 volume %, and more preferably 0.5 to 3 volume %. Thins concentration is, particularly for example, 0.1, 0.2, 0.5, 1, 1.5, 2, 2.5, 3, 10, or 100 volume %, and can be in the range between the two values exemplified herein.

The metal fine particles 130 after the heat treatment in the heat treatment step can be in an oxidized condition. In such case, the metal fine particles 130 may not show catalyst activity. The catalyst activity can be increased by reducing the metal fine particles 130.

EXAMPLES

The support and metal catalyst was manufactured in accordance with the method described below, and various evaluations were performed.

1. Manufacture of Support and Metal Catalyst 100

Example 1

(Manufacture of Support Powder)

By using the manufacturing apparatus 1 shown in FIG. 6 to FIG. 9, support powder was manufactured. As the burner gas 2a, gas prepared by blending 5 L/min of oxygen and 1 L/min of propane gas was used. This gas was ignited to form a flame (chemical flame) 7 of 1600° C. or higher at the tip of the burner 2. The raw material solution 23a was prepared by blending tin octylate and niobium octylate by a molar ratio of 0.95:0.05, and then the blend was further combined with mineral spirit terpen and dissolved. Oxygen was used as the mist gas 13a. 9 L/min of the mist gas 13a and 3 g/min of the raw material solution 23a were blended and sprayed from the tip of the raw material supplying unit 3 which is a spray nozzle (atomizer) towards the center portion of the flame, thereby allowing combustion of the blend and generation of the support powder which is an aggregate of the support fine particles 150. During such, negative pressure was applied to the gas discharging portion 5b to suction air from slit 6b at a flow rate of 170 L/min, thereby collecting the generated support powder in the collector 5 (with filter 5a). The raw material supplying unit 3 comprises a double tube structure (overall length of 322.3 mm). Oxygen is supplied from the outer cylinder 13, and the raw material solution 23a is supplied to the raw material distribution cylinder 23. At the tip of the raw material distribution cylinder 23, a fluid nozzle and an air nozzle are provided, and the raw material solution 23a was converted into the mist 23b at this position. The amount of the support powder collected was 10 g or more when the operation was carried out for 60 minutes.

(Support, Heat Treatment, and Reduction of Metal Fine Particles 130)

Subsequently, metal fine particles 130 were supported onto the support powder, and then heat treatment and reduction were performed.

<Supporting Step>

First, 0.57 mL of chloroplatinic acid hexahydrate aqueous solution was dissolved in 38 ml of super pure water, followed by addition of 1.76 g of sodium carbonate, and then the mixture was agitated.

The solution was diluted with 150 ml of water, and pH of the solution was adjusted to 5 with NaOH. Thereafter, 25 ml of hydrogen peroxide was added, and the pH was again adjusted to 5 with NaOH. Further, $CoCl_2$ solution ($CoCl_2$ (available from KANTO CHEMICAL CO., INC.)/15 mL of super pure water) was titrated at 2 mL/min and the mixture was agitated.

To the dispersion, a dispersion prepared by dispersing 0.50 g of support powder in 15 mL of super pure water was added, and the mixture was agitated for 3 hours at 90° C. The mixture was cooled to room temperature, and was then filtered. The residue was washed with super pure water and alcohol, and was then dried overnight at 80° C. The metal fine particles 130 were accordingly supported on support powder.

<Heat Treatment Step>

In the heat treatment step, the sample after the supporting step was subjected to heat treatment under nitrogen atmosphere at 700° C. for 2 hours.

<Reduction Step>

In the reduction step, the sample after the heat treatment step was subjected to heat treatment for 2 hours in 1% hydrogen at 150° C. to reduce the metal fine particles 130.

With these procedures, support and metal catalyst 100 having metal fine particles 130 supported on fine powder was obtained.

Examples 2 to 3 and Comparative Example 1

Support and metal catalyst 100 was manufactured with a similar procedure as Example 1 except that the heat treatment temperature was altered as shown in Table 1.

2. Evaluation

<Measurement of Crystallite Size>

The crystallite size was obtained in accordance with a Sheller formula using half-width in the XRD pattern peak.

<Measurement of BET Specific Surface Area, Primary Pore Volume, and Secondary Pore Volume>

Pretreatment 0.2 g of the sample was weighed into a measuring glass cell and dehydrated at 130° C. under reduced pressure for 1 to 2 hours until the pressure became 30 mm Torr or lower. The cell was then slowly cooled to room temperature and purged with nitrogen.

Measurement Conditions

The BET specific surface area was determined by the BET method using a Micromeritics TriStar 3000 measurement instrument at relative pressures of 0.01 to 0.30. The pore volume distribution was obtained using the BJH method in the nitrogen gas adsorption process under relative pressure conditions of 0.01 to 0.98 using the afore-mentioned measurement instrument. The total volume of pores having a pore diameter of 25 nm or less in the obtained distribution was defined as the primary pore volume, and the total volume of pores having a pore diameter of more than 25 nm and 80 nm or less was defined as the secondary pore volume.

<Mass Activity>

The mass activity was determined using a standard cell according to Japan Automobile Research Institute (JARI) under the conditions of 80° C. and 1000 humidity.

TABLE 1

| Table 1 | Example | | | Comparative Example |
|---|---|---|---|---|
| | 1 | 2 | 3 | 1 |
| heat treatment temperature (° C.) | 700 | 600 | 500 | 800 |
| BET specific surface area (m$^2$/g) | 37.4 | 48.0 | 58.5 | 33.3 |
| crystallite size (nm) | 14 | 13 | 12 | 15 |
| primary pore volume (cm$^3$/g) | 0.037 | 0.048 | 0.051 | 0.036 |
| secondary pore volume (cm$^3$/g) | 0.052 | 0.069 | 0.075 | 0.039 |
| primary pore volume/ secondary pore volume | 0.71 | 0.70 | 0.68 | 0.91 |
| mass activity (A/g$_{pt}$) 80% humidity | 300 | 210 | 250 | 100 |
| mass activity (A/g$_{pt}$) 100% humidity | 280 | 225 | 180 | 120 |

3. Discussion

When compared with Comparative Example 1 in which heat treatment was performed at 800° C., Examples 1 to 3 in which heat treatment was performed at 500 to 700° C. showed high mass activity under high humidity environment of 80 to 100% humidity. This result is considered to be obtained since the secondary pore volume of Examples 1 to 3 are 0.045 cm$^3$/g or more and thus occurrence of flooding phenomenon has been suppressed. In addition, in Examples 1 to 3, the crystallite size is sufficiently large as 12 to 14 nm, thereby sufficiently suppressing elution of crystallite.

EXPLANATION OF SYMBOLS

1: manufacturing apparatus, 2: burner, 2a: burner gas, 3: raw material supplying unit, 4: reaction cylinder, 5: collector, 5a: filter, 5b: gas discharging portion, 6: gas reservoir, 6a: cold gas introducing portion, 6b: slit, 6c: inner peripheral wall, 6d: burner insertion hole, 6g: cold gas, 7: flame, 13: outer cylinder, 13a: mist gas, 23: raw material distribution cylinder, 23a: raw material solution, 23b: mist, 100: support and metal catalyst, 110: void, 120: crystallite, 130: metal fine particles, 150: support fine particles, 160: branch, 200: solid polymer electrolyte fuel cell, 201: anode, 202: cathode, 203: load, 210A: gas diffusion layer on anode side, 210K: gas diffusion layer on cathode side, 220A: catalyst layer on anode side, 220K: catalyst layer on cathode side, 230: electrolyte membrane

The invention claimed is:

1. A support and metal catalyst, comprising:
   a support powder; and
   metal fine particles supported on the support powder; wherein:
   the support powder is an aggregate of support fine particles;
   the support fine particles are fine particles of oxide compound and has a chained portion structured by a plurality of crystallites being fusion bonded to form a chain;
   the crystallites have a size of 10 to 30 nm;
   the support powder has a void;
   the void includes a secondary pore having a pore diameter of more than 25 nm and 80 nm or less determined by BJH method; and
   a volume of the secondary pore per unit volume of the support fine particles structuring the support powder is 0.313 cm$^3$/cm$^3$ or more, wherein:
   the void includes a primary pore having the pore diameter of 25 nm or less; and
   a value of volume of the primary pore/volume of the secondary pore is 0.80 or less.

2. The support and metal catalyst of claim 1, wherein:
   the chained portion has a plurality of branches and a pore surrounded by the plurality of branches; and
   the void is surrounded by the plurality of branches and the pore.

3. The support and metal catalyst of claim 1, wherein the oxide compound includes titanium or tin.

4. A support and metal catalyst, comprising:
   a support powder; and
   metal fine particles supported on the support powder; wherein:
   the support powder is an aggregate of support fine particles;
   the support fine particles are fine particles of oxide compound and has a chained portion structured by a plurality of crystallites being fusion bonded to form a chain;
   the crystallites have a size of 10 to 30 nm;
   the support powder has a void;
   the void includes a secondary pore having a pore diameter of more than 25 nm and 80 nm or less determined by BJH method; and
   a volume of the secondary pore per unit volume of the support fine particles structuring the support powder is 0.313 cm$^3$/cm$^3$ or more, wherein a specific surface area per unit volume of the support fine particles structuring the support powder is 83 m$^2$/cm$^3$ or more.

5. The support and metal catalyst of claim 4, wherein:
   the chained portion has a plurality of branches and a pore surrounded by the plurality of branches; and
   the void is surrounded by the plurality of branches and the pore.

6. The support and metal catalyst of claim 4, wherein the oxide compound includes titanium or tin.

7. A method for manufacturing metal catalyst supported on fine support powder, comprising:
   a support powder generation step;
   a supporting step; and
   a heat treatment step; wherein:
   a support powder which is an aggregate of support fine particles is generated by performing thermal decomposition of a metal compound under high temperature region of 1000° C. to 2000° C. in the support powder generation step;
   metal fine particles are supported on the support powder in the supporting step; and
   the support powder is subjected to heat treatment at 500 to 750° C. in the heat treatment step.

* * * * *